United States Patent [19]

Fischer et al.

[11] Patent Number: 5,523,136
[45] Date of Patent: Jun. 4, 1996

[54] PACKAGING FILM, PACKAGES AND METHODS FOR USING THEM

[75] Inventors: David C. Fischer, Pittsford; James I. Ririe, Fairport; Richard Mink, Rochester; Monty Bates, Victor, all of N.Y.

[73] Assignee: Cypress Packaging, Rochester, N.Y.

[21] Appl. No.: 54,961

[22] Filed: Apr. 30, 1993

[51] Int. Cl.$^6$ .................. B32B 27/28; B65D 75/00
[52] U.S. Cl. ............. 428/35.2; 428/34.9; 428/35.4; 428/36.7; 428/494; 428/516; 428/517; 428/519; 428/521; 426/393; 426/127; 426/129; 426/410
[58] Field of Search .................. 428/34.9, 35.4, 428/36.7, 494, 516, 517, 519, 349, 521, 35.2; 426/393, 127, 129, 410

[56] References Cited

U.S. PATENT DOCUMENTS

| | | | |
|---|---|---|---|
| 4,015,033 | 3/1977 | Nield | 428/35 |
| 4,039,364 | 8/1977 | Rasmussen | 156/164 |
| 4,082,877 | 5/1978 | Shadle | 428/500 |
| 4,096,013 | 6/1978 | Lutzmann et al. | 156/272 |
| 4,407,877 | 10/1983 | Rasmussen | 428/105 |
| 4,435,241 | 3/1984 | Corbett | 156/244.11 |
| 4,521,437 | 6/1985 | Storms | 426/130 |
| 4,795,665 | 1/1989 | Lancaster et al. | 428/34.2 |
| 4,808,387 | 2/1989 | Datta et al. | 585/525 |
| 4,808,561 | 2/1989 | Welborn, Jr. | 556/53 |
| 4,849,572 | 7/1989 | Chen et al. | 585/525 |
| 4,855,525 | 8/1989 | Young et al. | 585/523 |
| 4,855,528 | 8/1989 | Young et al. | 585/531 |
| 4,871,523 | 10/1989 | Datta et al. | 502/117 |

(List continued on next page.)

FOREIGN PATENT DOCUMENTS 0153884  12/1979  Japan.

OTHER PUBLICATIONS

"Exact™ Polymers For Targeted Performance in Film Packaging," Promotional material published by Exxon Chemical Company (1992).
"Exxpol Technology For Targeted Performance," Promotional material published by Exxon Chemical Company (1991).
"Exact Facts™," Exxpol™ Technology–Exxon Chemical Company, vol. 1, No. 1, (Feb. 1992).
Zimmer et al., "The Solventless Approach to Adhesive Compliance," Lord Library of Technical Articles (1984).
Tycel® 7975 Adhesive and Tycel® 7276 Curing Agent, Promotional material published by Lord Corporation (1984).
"K–Resin® Syrene–Bentadiene Copolymers KR05 Grade," Promotional material published by Phillips 66 Company (1991).
"K–Resin: Technical Service Memorandum 288: Food Packageability–K–Resin® Polymers," Promotional material published by Phillips 66 Company (1990).
"K–Resin: Technical Service Memorandum 316: K–Resin® Styrene–Bentadiene Copolymer Blends," Promotional material published by Phillips 66 Company (no date).
K–Resin Copolymer promotional material published by Phillips 66 Company (no date).

Primary Examiner—Charles R. Nold
Attorney, Agent, or Firm—Curtis, Morris & Safford

[57] ABSTRACT

The invention provides a film, a package and methods for employing the same. The film has a first layer of an elastomer and a second layer of a polyethylene such as a single site catalyst polyethylene. The film can have a third layer of a polyethylene such that the second layer is disposed between the first and third layers. The polyethylene of the third layer also can be single site catalyst polyethylene and, the elastomer of the first layer can be styrene butadiene copolymer. The film has an oxygen transmission rate of up to about 1000, such as 150–450 cc/100 in$^2$/24 hr., typically 260–400 cc/100 in$^2$/24 hr., with values of 300, 350–360, 400 cc/100 in$^2$/24 hr. and even higher exhibited by the film. The film is suitable for packages, for instance, packaging for cole slaw and leafy salad. The film also exhibits excellent clarity, durability, seal strength and machinability.

44 Claims, 1 Drawing Sheet

U.S. PATENT DOCUMENTS

| | | | |
|---|---|---|---|
| 4,871,705 | 10/1989 | Hoel | 526/129 |
| 4,897,274 | 1/1990 | Candida et al. | 426/127 |
| 4,897,455 | 1/1990 | Welborn, Jr. | 502/104 |
| 4,899,517 | 2/1990 | Shima et al. | 53/432 |
| 4,908,253 | 3/1990 | Rasmussen | 428/114 |
| 4,925,821 | 5/1990 | Chang | 502/107 |
| 4,935,397 | 6/1990 | Chang | 526/128 |
| 4,937,301 | 6/1990 | Chang | 502/107 |
| 4,952,714 | 8/1990 | Welborn, Jr. | 426/128 |
| 4,954,471 | 9/1990 | Best | 526/128 |
| 4,962,777 | 10/1990 | Bell | 134/6.3 |
| 4,981,007 | 1/1991 | Shima et al. | 53/432 |
| 4,982,872 | 1/1991 | Avery | 220/461 |
| 4,996,071 | 2/1991 | Bell | 426/419 |
| 5,001,205 | 3/1991 | Hoel | 526/128 |
| 5,001,244 | 3/1991 | Welborn, Jr. | 556/179 |
| 5,006,500 | 4/1991 | Chang | 526/128 |
| 5,013,803 | 5/1991 | Best | 502/110 |
| 5,017,665 | 5/1991 | Chang | 526/129 |
| 5,026,798 | 6/1991 | Canich | 526/129 |
| 5,032,652 | 7/1991 | Chang | 502/107 |
| 5,045,331 | 9/1991 | Antoon, Jr. | 426/118 |
| 5,077,255 | 12/1991 | Welborn, Jr. | 526/129 |
| 5,079,205 | 1/1992 | Canish | 526/128 |
| 5,084,534 | 1/1992 | Welborn, Jr. et al. | 526/114 |
| 5,096,067 | 3/1992 | Tutamune et al. | 209/551 |
| 5,112,674 | 5/1992 | German et al. | 428/216 |
| 5,114,795 | 5/1992 | Percec et al. | 428/516 |
| 5,124,418 | 6/1992 | Welborn, Jr. | 526/114 |
| 5,145,950 | 9/1992 | Funaki et al. | 528/481 |
| 5,158,836 | 10/1992 | Schirmer | 428/336 |
| 5,183,867 | 2/1993 | Welborn, Jr. | 502/104 |

PACKAGING FILM, PACKAGES AND METHODS FOR USING THEM

FIELD OF THE INVENTION

The present invention relates to films and packages therefrom and to methods for using them. The films have at least two layers including and elastomer layer such as butadiene styrene copolymer and a layer from a single site catalyst polyethylene.

BACKGROUND OF THE INVENTION

Foods such as fresh, precut vegetables as a product in a package formed from film present unique problems. When living as part of a plant, vegetables absorb carbon dioxide from the atmosphere and release oxygen. However, when cut or picked from the plant, the vegetable tends to absorb oxygen and release carbon dioxide (reverse photosynthesis). Thus, the nature of vegetables calls for packaging having certain permeability characteristics.

From health, safety and shelf-life perspectives, packaging for fresh, precut vegetables must have certain gas permeability characteristics. For instance, packaging for a leafy vegetable such as chopped cabbage without dressing (precut cole slaw) must have an oxygen transmission rate (OTR) of about 300 to 400 cc/100 in$^2$/24 hr. If precut vegetables are in a package which has low permeability to gases such as oxygen (OTR), bacteria growth inside the package can be stimulated, which can spoil the vegetables. The bacteria can also grow undetected without malodor or spoiling the food, and cause sickness. Further, this condition can lower the shelf-life of the vegetables. An approach to obtaining desired carbon dioxide and oxygen transmission through a package is to provide the package with loose or open seals or, perforations. However, this approach literally leaves the food exposed to all possible contaminants, including bacteria, lowers the shelf-life of the food, and, to some extent, defeats the purpose of employing packaging.

In addition, food such as fresh precut vegetables is an item which the consumer prefers to visually inspect prior to purchasing, for instance, to see if the vegetables have spoiled. If the packaging is cloudy or not sufficiently transparent or translucent, the food is not especially desirable to the consumer. Likewise, the packaging should not be too soft in order to provide adequate protection for the food. The packaging should also be able to be sealed, such as by heat-sealing, with a seal which is sufficiently strong so as to also provide adequate protection for the food. Further, the packaging should not be constructed from materials having high levels of extractables because these materials tend to impart unpleasant odors or tastes to the food.

To meet the unique situation of vegetable packaging, it has been proposed to use oriented polypropylene adhered by adhesive lamination to polyethylene. The polyethylene being heat-sealable allows the film to be formed into a package. Likewise, it has been proposed to coextrude unoriented polypropylene and very low density polyethylene (VLDPE) and adhesively laminate the multi-layer coextrusion at the VLDPE side to another layer of VLDPE. These types of structures however do not provide enhanced shelf life for vegetables with high respiration requirements; for instance, cole slaw, broccoli and cauliflower.

In particular, these packages do not exhibit sufficiently high or sufficiently consistently high OTR, or seal strength.

It has also been proposed to coextrude butadiene styrene as a core layer between two layers of polyethylene such as very low density polyethylene. However, this structure does not allow for resistant type crimp seals as typically used in the snack food industry. The VLDPE is the temperature-sensitive heat seal layer and, the butadiene styrene, which is more heat resistant, is in the core. Thus, the high temperature heat sealing apparatus contacts the more temperature sensitive VLDPE rather than the butadiene styrene. Accordingly, the seal temperature must be sufficiently low so as to prevent damage to the heat-sealable VLDPE layer contacting the heat-sealing apparatus resulting in a low seal strength seal. In addition, such a structure can only be printed upon its outer surface, rendering the printing exposed to scuffing. The package will therefore lose its label or be visually unappealing. Likewise, polyethylene such as linear low density polyethylene has been used as a skin layer in an A/B/A film structure with another material such as a copolymer of ethylene and an ethylenically unsaturated comonomer, for instance ethylene vinyl acetate (EVA), being the core layer. This type of film structure can suffer from the disadvantages of low seal strength because both outer layers are temperature sensitive heat seal layers, and unpleasant odor or taste from the EVA.

However, characteristics such as heat sealability are not the only criteria by which one evaluates a film structure for suitability to package food such as vegetables. Health and safety considerations are very important. Thus, to obtain the desired OTR, certain films are adhered to a monolayer of polyethylene such as ultra linear low density polyethylene (ULDPE). However, films from these resins tend to be soft and cloudy, rendering the film unsuitable with respect to appearance and limiting its utility to impulse seals and not resistant seals.

Typically, polyethylene resins employed in packaging are low density polyethylene (LDPE), linear low density polyethylene (LLDPE), high density polyethylene (HDPE), VLDPE or ULDPE. These polyethylenes are typically made with traditional Ziegler-type catalysts which contain different types of reaction sites which result in the polyethylene containing a broad range of molecules. For instance, the typical polyethylene contains polymers having medium molecular weight with medium branching, low molecular weight with high branching, and high molecular weight with low branching. This results in inconsistent properties.

With respect to packaging materials, ecological considerations as well as economic considerations make it desirable to have as few layers as possible with the most favorable combination of properties. In particular, it would be desirable to have a two- or three- layered structure which has optimal clarity, optimal strength, can be readily heat sealed, has a strong heat seal, can be readily printed upon, has protection for the printing, and, provides the proper barrier properties for products such as vegetables.

OBJECTS AND SUMMARY OF THE INVENTION

It is an object of the present invention to provide a film which has an OTR of up to about 1000 such as about 150 to about 450, preferably about 260–400, more preferably about 300–400 cc/100 in$^2$/24 hr.

It is another object of the invention to provide a film which can be heat sealed and, which has a strong seal.

It is yet a further object of the invention to provide a film which is sufficiently durable so as to be useful as a packaging material for food, particularly leafy vegetables such as cole slaw and salad mix.

It is also an object of the invention to provide a film which has sufficient clarity so as to be useful as a packaging material for food.

It is additionally an object of the invention to provide a film which can be printed upon and, wherein the printing can be protected from scuffing.

It is yet another object of the invention to provide a film having as few layers as possible to obtain the desired combination of properties.

It is also an object of the invention to provide a package from a film.

And, it is an object of the invention to provide a method for packaging a product.

It has been surprisingly found that polyethylenes from a catalyst having one type of catalytic site provide excellent properties with the respect to heat sealability and, oxygen and carbon dioxide transmission. It is further surprising that an elastomer such as butadiene styrene copolymer can be employed as an outer layer over such a single site catalyst polyethylene to provide a film which can meet the needs of the food packaging industry.

Thus, the present invention provides a film having oxygen permeability of up to about 1000, typically about 150–450 cc/100 in$^2$/24 hr. The film comprises a first outer layer of an elastomer which is preferably heat resistant such as butadiene styrene copolymer and, a second layer of a single site catalyst polyethylene. The film preferably has an oxygen permeability of about 260–400 and, more preferably about 300–400 cc/100 in$^2$/24 hr.

The present invention also provides a coextruded film comprising a first outer layer of butadiene styrene copolymer and, a second layer of single site catalyst polyethylene. In a preferred embodiment, the film includes a third layer of single site catalyst polyethylene which is adhesively laminated to the second layer. The three layer film can also include printing on the second or third layer.

The present invention also comprehends packages from the films of the invention wherein the second or third layer is heat sealed. The invention further includes a method for packaging a product such as food, preferably vegetables, more preferably, leafy vegetables such as salad or cole slaw, comprising sealing the product in a package made from the film. In addition, the invention comprehends a method for preserving a product comprising storing the food in a package of the invention.

BRIEF DESCRIPTION OF THE DRAWINGS

In the following detailed description reference will be made to the accompanying drawings wherein.

DETAILED DESCRIPTION

Turning initially to the Figs., FIGS. 1–4 show films 1–4 of the invention. The films are shown in cross-section and, the thickness of layers is arbitrary and not to necessarily represent the actual thickness of layers of the inventive film.

Figure 1:
FIG. 1 shows in cross-section a two layer film structure of the invention.

Film 1 of FIG. 1 is a two-layer structure comprised of layers 10 and 20. Layer 10 is an elastomer such as butadiene styrene and, layer 20 is comprised of a single site catalyst polyethylene, which is discussed in more detail below. Layers 10 and 20 can be joined by any suitable means. Co-extrusion is preferred.

Figure 2:
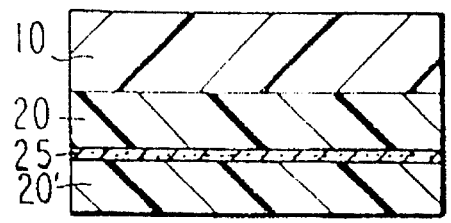
FIG. 2 shows in cross-section a three layer film structure of the present invention.

FIG. 2 shows film 2 comprised of layers 10, 20 and 20' and, adhesive 25. Layers 10 and 20 are comprised of the same materials as layers 10 and 20 of film 1 of FIG. 1 (hence the same numbering). Since layer 20' is also comprised of single site catalyst polyethylene but is a separate layer, it is numbered similarly to layer 20 of FIGS. 1 and 2, but is given the prime designation because it is a separate layer. In FIG. 2 layer 20 is between layers 10 and 20', with layer 20' having been separately extruded and, adhesive 25 adhering layers 20 and 20' to each other.

Figure 3:
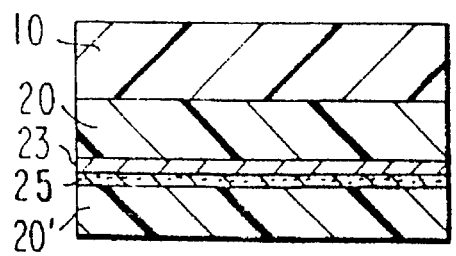
FIG. 3 shows in cross-section a three layer structure of the present invention with printing.

FIG. 3 shows three-layered film 3 which is akin to film 2 of FIG. 2, except that printing 22 is on the inner surface of layer 20, between layer 20 and adhesive 25.

Figure 4:
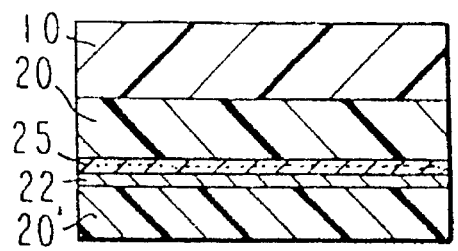
FIG. 4 shows in cross-section a three layer structure of the present invention with printing; and, FIG. 5 shows a package of the present invention.

Film 4 of FIG. 4 is the same as film 3 of FIG. 3, except that the order of the printing and adhesive are reversed. That is, printing 22 is on the outer surface of layer 20', between layer 20' and adhesive 25.

Figure 5:
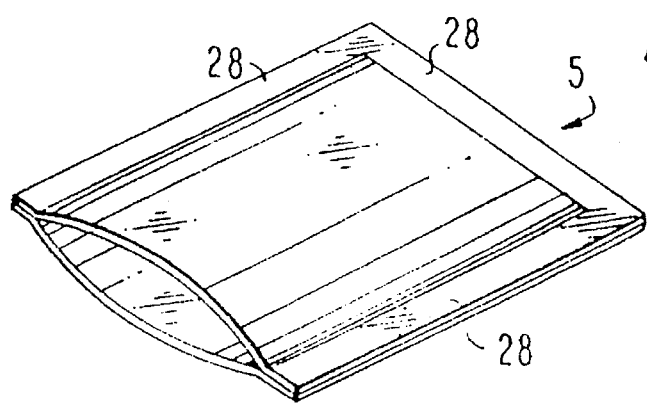

FIG. 5 depicts package 5 of the invention wherein a sheet of film of the invention is heat sealed at the periphery. Typically, portions of the sheet are brought into face-to-face relationship with layers 20 or 20' on each portion facing the opposing portion. Heat seals 28 are then formed at or near the periphery to define an enclosed area. One side is left open, as shown, for insertion of the product to be packaged and, the filled package is then closed and heat sealed along the open side. Heat seals 28 can be heat resistant type seals as found in snack food packaging.

Alternatively, the film may be made into a package by means of a form, fill and seal apparatus. For instance, the film can be formed into a tube by forming a fin seal along opposing edges and, a transverse seal is also formed across the width of the tube (see, e.g., U.S. Pat. No. 4,521,437, incorporated herein by reference). This process is suitable for vertical form, fill and seal machines.

Package 5 of FIG. 5 can also contain resealing means positioned away from a peripheral heat seal. For instance, slot means can be provided on one interior face and tab means on the opposing interior face of the package such that after the heat seal is cut away, the consumer can reseal the package by mating the tab with the slot. Such resealing means or slot and tab means can be of the nature of the "zipper" or "zip-lock" type on existing plastic bags such as Dow's ZIPLOC™ or Illinois Tool Works' ZIP PAK® food storage bags.

Turning to elastomer layer 10, this layer can be any suitable elastomeric polymer such as butadiene styrene copolymer, polymethylpentene, polybutylene, polyisobutylene, ethylene propylene diene monomer terpolymer, styrene butadiene styrene copolymer, styrene ethylene butylene copolymer, styrene isoprene styrene copolymer, polybutene-1, isobutylene rubber, methyl acrylate butadiene styrene copolymer, acrylonitrile butadiene styrene copolymer, acrylonitrile alkylacrylate butadiene styrene copolymer, methyl methacrylate alkyl acrylate styrene copolymer, methyl methacrylate alkyl acrylate butadiene styrene copolymer, and the like. Considerations for selecting a material for layer 10 include sufficient heat resistance, OTR, strength and clarity.

Butadiene styrene copolymer is a presently preferred elastomer for layer 10. Preferred butadiene styrene copolymers are those of the K-Resin® series from Phillips 66, e.g., KR03, KR04, KR05 and KR10. Of these, KR05 is preferred and, its normal physical properties are set forth below in Table 1.

TABLE 1

NOMINAL PHYSICAL PROPERTIES OF KR05 SB COPOLYMER**

| PROPERTY | ASTM | ENGLISH UNIT | VALUE | SI UNIT | VALUE |
|---|---|---|---|---|---|
| Density | D792 | g/cc | 1.01 | g/cc | 1.01 |
| Flow Rate, Condition G | D1238 | g/10 min | 8.0 | g/10 min | 8.0 |
| Tensile Yield Strength | D638 | | | | |
| 2 in (50 mm) per min* | | % | 160 | % | 160 |
| Flexural Modulus* | D790 | psi | 205,000 | MPa | 1413 |
| Flexural Yield Strength* | D790 | psi | 4900 | MPa | 34 |
| Heat Deflection Temperature | D638 | | | | |
| 264 psi (1.8 MPa) Fiber Stress | | °F. | 163 | °C. | 73 |
| Izod Impact Strength | D256 | | | | |
| ⅛ in (3.2 mm) Specimen | | ft-lbf/in | 0.75 | J/m | 41 |
| Hardness, Shore D | D2240 | | 65 | | 65 |
| Vicat Softening Point | D1525 | °F. | 188 | °C. | 87 |
| Light Transmission | — | % | 90 | % | 90 |
| Moisture Absorption, 24 h | D570 | % | 0.09 | % | 0.09 |

*Specimen injection molded by ASTM Method D1897.
**From Product Literature

Other elastomeric materials exhibiting substantially similar properties or suitable heat resistance, OTR, strength and clarity characteristics can be employed for layer 10 and, one can sacrifice clarity if visual appearance and inspection of the packaged product is not a major consideration.

As to layers 20 and 20', metallocene catalyst systems are utilized for producing polyethylenes such as those described in U.S. Pat. Nos. 4,808,561, 4,871,705, 4,871,523, 4,897,455, 4,925,821, 4,935,397, 4,937,301, 4,952,714, 5,001,205, 5,001,244, 5,006,500, 5,013,803, 5,017,655, 5,026,798, 5,032,652, 5,077,255, 5,079,205, 5,084,534, 5,124,418 and 5,183,867 each of which is hereby incorporated herein by reference. Metallocene catalysts tend to have one type of reaction site, as opposed to traditional Zeigler-type catalysts which have different types of reaction sites. Polyethylenes from Zeigler-type catalysts are polymers containing a broad range of molecules. Polyethylenes from catalysts having one type of reaction site have been found to be more consistent and exhibit superior properties over conventional polyethylenes. Polyethylene polymers from a catalyst having one type of reaction site are herein termed "single site catalyst polyethylene" and, are commercially available from Exxon Chemical as "EXACT™" products such as EXACT™ 2009, 2010, 3001, 3006, 3016, 3025, 3026, 3027, 3028 and, 4011. Presently EXACT™ 3025 and EXACT™ 3028 are preferred single site catalyst polyethylenes. Typical properties for the single site catalyst polyethylenes EXACT™ 3025 and EXACT™ 3028 (from Exxon Chemical Product Literature) are set forth in Tables 2 and 3, below.

TABLE 2

EXACT ™ 3025
(LINEAR ETHYLENE-BASED COPOLYMER)

| | ASTM METHOD | UNITS | TYPICAL VALUE |
|---|---|---|---|
| POLYMER PROPERTIES | | | |
| Melt Index | D-1238 (E) | dg/min | 1.2 |
| Density | D-792 | g/cm | 0.910 |

TABLE 2-continued

EXACT ™ 3025
(LINEAR ETHYLENE-BASED COPOLYMER)

| | ASTM METHOD | UNITS | TYPICAL VALUE |
|---|---|---|---|
| DSC Peak Melting Point | Exxon Method | °C. | 103 |
| Film Properties[1,2] | | | |
| 1% Secant Modulus | D-882 | psi (MPa) | |
| MD | | | 16900 (117) |
| TD | | | 18000 (124) |
| Tensile Strength @ Yield | D-882 | psi (MPa) | |
| MD | | | 980 (6.8) |
| TD | | | 930 (6.4) |
| Tensile Strength @ Break | D-882 | psi (MPa) | |
| MD | | | 8140 (56) |
| TD | | | 5680 (39) |
| Elongation @ Break | D-882 | % | |
| MD | | | 640 |
| TD | | | 660 |
| Elmendorf Tear Strength | D-1922 | g/mil | |
| MD | | | 111 |
| TD | | | 237 |
| Dart Drop Impact, $F_{50}$ | D-1709 | g/mil | >1050 |
| Puncture, Force | Exxon Method | lbs/mil | 5.9 |
| Energy | | in-lbs/mil | 14.3 |

TABLE 2-continued

EXACT ™ 3025
(LINEAR ETHYLENE-BASED COPOLYMER)

| | ASTM METHOD | UNITS | TYPICAL VALUE |
|---|---|---|---|
| Total Energy Impact | D-4272 | ft-lbs | |
| @ 23° C. | | | 2.1 |
| @ −29° C. | | | 1.7 |
| Haze | D-1003 | % | 3.7 |
| Gloss | D-2457 | % | 79 |

[1]1.25 mil film produced on a 2.5' blown film line with 2:1 BUR, melt temperature between 380–415° F., and throughout of 8 lbs/hr/in die.
[2]Films contain 500 PPM slip and 2000 PPM antiblock.

TABLE 3

EXACT ™ 3028
(LINEAR ETHYLENE-BASED COPOLYMER)

| | ASTM METHOD | UNITS | TYPICAL VALUE |
|---|---|---|---|
| POLYMER PROPERTIES | | | |
| Melt Index | D-1238 (E) | dg/min | 1.2 |
| Density | D-792 | g/cm | 0.900 |
| DSC Peak Melting Point | Exxon Method | °C. | 92 |
| Film Properties[1,2] | | | |
| 1% Secant Modulus | D-882 | psi (MPa) | |
| MD | | | 10600 (73) |
| TD | | | 10800 (74) |
| Tensile Strength @ Yield | D-882 | psi (MPa) | |
| MD | | | 660 (4.6) |
| TD | | | 610 (4.2) |
| Tensile Strength @ Break | D-882 | psi (MPa) | |
| MD | | | 8670 (60) |
| TD | | | 7250 (50) |
| Elongation @ Break | D-882 | % | |
| MD | | | 590 |
| TD | | | 680 |
| Elmendorf Tear Strength | D-1922 | g/mil | |
| MD | | | 123 |
| TD | | | 177 |
| Dart Drop Impact, $F_{50}$ | D-1709 | g/mil | >1058 |
| Puncture, Force | Exxon | lbs/mil | 7 |
| Energy | Method | in-lbs/mil | 21 |
| Total Energy Impact | D-4272 | ft-lbs | |
| @ 23° C. | | | >6.2 |
| @ −29° C. | | | 2.2 |
| Haze | D-1003 | % | 3.1 |
| Gloss | D-2457 | % | 83 |

[1]1.25 mil film produced on a 2.5' blown film line with 2:1 BUR, melt temperature between 380–415° F., and throughout of 8 lbs/hr/in die.
[2]Films contain 500 PPM slip and 2000 PPM antiblock.

The EXACT™ 3025 and 3028 are copolymers of ethylene and 1-butene and are linear ethylene polymers which are unique types of very low density polyethylenes. These single site polyethylenes have a narrow molecular weight distribution, typically greater than 1,000 and less than 100,000 and, a narrow range of single chain branching of about 12 or 12.5 to about 30 SCB/1000 carbons. Single site catalyst polyethylenes have an absence of low molecular weight, high comonomer content molecules, an absence of high molecular weight, low comonomer molecules, a narrow molecular weight distribution with slightly lower melt strength than traditional linear polymers and, a slightly flatter shear rate viscosity curve. Single site polyethylenes are a preferred material for a layer 20 or 20' of the film of the present invention. Other suitable materials can be employed for layer 20 or 20' if the material exhibits similar properties to the preferred single site catalyst polyethylene or, the resultant film displays the desired seal strength and OTR characteristics. For instance, other single site catalyst polyethylenes which can be used for layer 20 or 20' include Exxon's Exact™ and Exxpol™ resins as well as Dow's Insite™ resin. The use of single site catalyst polyethylene as a layer provides distinct advantages such as more consistency in OTR. For example, films including polypropylene have experienced wide swings in OTR: if the thickness of the polypropylene layer varies by 0.1 mil, then a 20% variation in OTR may be observed and, this is not a tolerable variation in the packaging industry.

Adhesive layer 25 can be any suitable adhesive to laminate the coextrusion comprising layers 10 and 20 to layer 20' such as solvent or liquid adhesive, e.g., water-based or urethane adhesive, or solid adhesive. The adhesive should not detract from the desired characteristics of the film. Preferred adhesives for layer 25 are solventless adhesives such as the TYCEL® laminating adhesives available from the Lord Corporation, e.g., the TYCEL® 7975 Adhesive and TYCEL® 7276 curing agent.

Printing 22 can be imparted to the film by flexographic or rotogravure apparatus, with the ink employed preferably being suitable for food packaging. Referring to FIG. 1, printing can be placed upon the outer exposed or inner surface of layer 10 or, the surface of layer 20 which is in contact with layer 10.

The film of the invention can be any suitable thickness. Thickness can be varied depending upon the end use for the film. Typical thicknesses may range from about 3 microns to about 0.030 inches (0.25 mm) for a thin film to about 1 to 2 mm if a thick film is desired. With reference to FIGS. 1–4, layer 10 is typically about 0.5 to 2.0 mils thick, preferably about 1.0 to 1.5 mils thick. Layers 20 and 20' are typically about 0.1 to about 1.5 mils thick. Accordingly, films 1 to 4 are typically about 0.6 to about 3.5 mils thick, preferably about 1 to 3 mils thick and, more preferably about 2 to 2.5 mils thick. The film can be supplied to users in a rollstock format for automatic form, fill and seal equipment or, it can be made into preformed bags or pouches (see FIG. 5).

The film of the invention is especially useful for packaging food such as precut produce, for instance, lettuce, cabbage, salad mixes, cole slaw mix, potatoes, onions and other vegetables and fruits, especially those which tend to respire. For washing and cooling produce and for determining and controlling the proper modified or unmodified packaging atmosphere for perishables such as produce, reference is made to U.S. Pat. Nos. 4,996,071 and 4,962,777, incorporated herein by reference. However, the invention is not necessarily limited by the product contained within a package made from the inventive film as the film can suitably be used whenever a "breathable" package is desired. However, the inventive film is especially useful for packaging food products which tend to oxidize because these foods require packaging having an OTR of about 260–400 cc/100 in$^2$/24 hr. Indeed, in packaging from the inventive film, cole slaw and leafy salads have an excellent shelf-life of about 4 to about 6 weeks. The inventive film exhibits OTRs of up to 1000 and from 150–450, typically 260–450, such as 300, 350 and 400 cc/100 in$^2$/24 hr. Furthermore, the inventive film and packages therefrom exhibit excellent clarity and seal strength. Thus, the inventive film and packages are suitable for the food service industry (e.g., hospitals, schools, restaurants, fast food, etc.) where appearance and seal strength are especially important and, long shelf-life may be required.

While coextrusion is preferred for forming film 1 (FIG. 1) and, adhesive lamination is preferred for adhering layer 20' to layer 20 (films 2–4; FIGS. 2–4), the films of the present invention can manufactured by any suitable means. With reference to FIGS. 1–4, layers 10, 20 and 20' may be joined by coextrusion, lamination, extrusion lamination and the like.

Further, while the invention has been illustrated with respect to two- and three- layer films, additional layers may be present. However, it is desirable that the films exhibit the permeability (OTR values) of the illustrated and exemplified two- and three-layer films. Likewise, if additional layers are present, the outer layer (layer 10 in FIGS. 1–4) should be from a heat resistant elastomer and, the innermost layer should be a heat sealable polymer, preferably a polyethylene and, most preferably a single site catalyst polyethylene. Thus, between layers 10 and 20, between layers 20 and 20' or between both layers 10 and 20 and layers 20 and 20' can be an additional layer or layers from any suitable material such as polyethylene, LDPE, LLDPE, ULDPE, VLDPE, HDPE, polypropylene, oriented polypropylene, single site catalyst polyethylene, an elastomer (such as those mentioned above for layer 10 or other commercially available materials such as ethylene-propylene and ethylene-butene copolymer elastomers), or blends thereof. However, given the excellent performance of the two- and three-layer films of the invention and economic and ecological considerations, additional layers are not considered necessary.

The following non-limiting Examples are given by way of illustration only and are not to be considered a limitation of this invention.

EXAMPLES

Example 1: Three-ply Film

A three-ply A/B/B film according to the invention was made by coextruding the A/B layers (A=butadiene styrene, KR05; B=EXACT™ 3025 single site catalyst polyethylene) and, adhesively laminating the coextruded structure to the separately extruded third "B" layer (Adhesive laminate= TYCEL® 7925 and 7276). The coextruded structure had a 1.3 mil total thickness comprised of 1 mil butadiene styrene and 0.3 mil single site catalyst polyethylene. The inner film had a 1.2 mil thickness. The total structure 2.5 mil had a thickness and had an oxygen transmission rate of 160 cubic centimeters per one hundred square inches in a twenty four hour period.

Example 2: Three-ply Film

A three-ply A/B/B film according to the invention was made by coextruding the A/B layers (A=butadiene styrene, KR05; B=EXACT™ 3028 single site catalyst polyethylene) and, adhesively laminating the coextruded structure to the separately extruded third "B" layer (Adhesive laminate= TYCEL® 7975 and 7276). The coextruded structure had about a 1 mil thickness comprised of 0.7 mil butadiene styrene and about 0.2 mil single site catalyst polyethylene. The innermost "B" film had a 1 mil thickness. The total structure had a 2 mils thickness and had an oxygen transmission rate of 360 cubic centimeters per one hundred square inches in a twenty-four hour period.

Example 3: Three-ply Film

A three-ply A/B/B film according to the invention was made by coextruding the A/B layers (A=butadiene styrene, KR05; B=EXACT™ 3025 single site catalyst polyethylene) and, adhesively laminating the coextruded structure to the separately extruded third "B" layer (Adhesive laminate= TYCEL® 7975 and 7276). The coextruded structure had about a 1 mil thickness comprised of 0.7 mil butadiene styrene and about 0.3 mil single site catalyst polyethylene. The innermost "B" film had a 1.2 mil thickness. The total structure had a 2.2 mils thickness and had an oxygen transmission rate of 250 cubic centimeters per one hundred square inches in a twenty-four hour period.

Each of Examples 1–3 utilized butadiene styrene and single site catalyst polyethylene, but, the polyethylenes varied in density, effecting the oxygen transmission rates. By further varying the density of the single site catalyst polyethylene and/or changing the heat resistant layer (layer 10 in FIGS. 1–4), for instance to polymethylpentene, the films of the invention can achieve OTR values up to 1000, for instance, in the 800–1000 cc/100 in$^2$/24 hr range for products such as broccoli, cauliflower and the like and, in the 600–700 cc/100 in$^2$/24 hr range for packaging of product such as baby carrots (see Example 5).

Example 4: Three-ply Film

A two-ply A/B film according to the invention was made by coextruding the A/B layers (A=butadiene styrene, KR05; B=EXACT™ 3028). Each layer was about 1.0 mil thick and, the film had a total thickness of about 2.0 mil. The film had an oxygen transmission rate of about 340 cubic centimeters per one hundred square inches in a twenty-four hour period.

Example 5: Three-ply Film

A two-ply A/B film according to the invention is made by coextruding polymethylpentene (as the A layer) and single site catalyst polyethylene (as the B layer). The film is about 1.25 mil thick and, respires in the 1000 cc/100 in$^2$/24 hr range.

Example 6: Three-ply Film

Film as per Example 2 was formed into packages with form, fill and seal apparatus and, a comparative film having an A/B/B structure (wherein the A/B layers were a coextrusion and the third "B" layer was adhesively laminated to the second "B" layer (A=unoriented polypropylene; B=VLDPE)) was also formed into packages with form, fill and seal apparatus. The comparative film was also about 2 mil total thickness with the third "B" layer about 1 mil thick and, the A/B coextrusion was about 1 mil thick (A≡0.3; B≡0.7 mil).

The packages were filled with one pound shredded cabbage or, 8 ounces of: broccoli florets; or cauliflower florets; or vegetable blends. The comparative film and the packages therefrom had an OTR of about 220 cc/100 in$^2$/24 hr whereas the inventive film and packages therefrom exhibited OTR approximately in accordance with Example 2 (about 350–360 cc/100 in$^2$/24 hr). The packages from the inventive film and cabbage, broccoli, cauliflower and vegetable blends therein were acceptable: the cabbage, broccoli, cauliflower and vegetable blends exhibited satisfactory characteristics associated with sufficient oxygen transmission, e.g., no foul odor.

The cabbage, broccoli, cauliflower and vegetable blends packaged in the package from the comparative film exhibited unsatisfactory quality characteristics associated with low package oxygen levels, e.g., foul odor. Thus, the ultimate product (packaged cabbage, broccoli, cauliflower, vegetable blend or vegetables in general) was not acceptable; and accordingly, the comparative film was not acceptable for this utility. The ultimate product and its acceptability depended directly on the OTR characteristics of the film of the package.

Indeed, produce such as broccoli requires a package having an OTR of at least 300 cc/100 in$^2$/24 hr. The approximately 39% lower OTR of the competitive film (0.39×360≅220) was unsuitable and unacceptable as were packages and ultimate products (the cabbage, broccoli, cauliflower and vegetables) therefrom. The high OTR of the inventive film allows it to be used for packaging products requiring high respiration requirements such as certain vegetables, e.g., broccoli, cauliflower, cole slaw and the like and, it can also be used for lower transmission products like Romaine lettuce.

For fresh produce items having high respiration requirement, such as cabbage, broccoli and cauliflower, and various blends of such vegetables, the packages from the inventive film as per Example 2 demonstrated OTR characteristics which provided an acceptable ultimate product, i.e., without causing the critical odor quality defects associated with insufficient oxygen in the package. As the produce item respired in the package, oxygen was consumed; the film OTR of the inventive film was the package characteristic which permitted new oxygen into the package at a rate sufficient to maintain the equilibrium oxygen level required for a good quality product inside the package. The inventive film exhibited sufficiently high OTR to prevent production of the foul odors associated with anaerobic respiration. The comparative film failed to achieve an acceptable ultimate product (one without foul odor). Thus, the inventive film provided a package and an ultimate product therein which was acceptable and of good quality whereas the competitive film failed to achieve such.

Example 7: Three-ply Film

A film as per Example 2 was formed into a package with form, fill and seal apparatus. The package contained 1 lb. cole slaw mix. The jaw seal was resistance type and, the seam seal was fin type. The web width was 17⅜ inches. The film and package were tested on a scale of "poor", "fair", "good", "very good" and "excellent" for the following characteristics (with rating also provided):

| CHARACTERISTIC | RATING |
| --- | --- |
| End Seal — Heat & Dwell Range | Excellent |
| End Seal Integrity | Excellent |
| Seam Seal — Heat & Dwell Range | Excellent |
| Seam Seal Integrity | Excellent |
| Bottom End Seal Speed 50 bpm | Excellent |
| Seal Thru Wrinkles — End Seam | Excellent |
| Seal Thru Wrinkles — Seam Seal | Excellent |

The package was also leak tested (evaluated for seal integrity, seal strength and stress handling) by submerging it in a vacuum chamber, and was "ok" (no leak) at 15", 20" and 23" vacuum (the latter being the maximum of the chamber).

The film was overall rated as excellent, very user friendly, with no wrinkles in the side seam, very minor wrinkles in the end seals, nice clarity and, excellent sealability. The inventive film is very machinable and, can overcome prior art seal problems, while providing a package having desired OTR, strength and appearance characteristics.

A utility of the inventive film is packaging for produce items with high oxygen requirements, especially on form, fill and seal apparatus such as high speed form-fill seal (FFS) equipment. Key characteristics of the inventive film which make it uniquely capable of achieving this utility (objective) are related to the multilayer laminate film structure combined with the high oxygen transmission rate (OTR) of the film.

The laminated construction of the inventive film provides FFS machine characteristics which permitted high operating speeds along with bag seals of high strength and integrity (resistance seals). Thus, the ultimate product e.g., packaged vegetables, can be produced at cost effective line speeds with a very low incidence of package seal failure. The inventive film was tested and found to be the only laminate film which can be resistance sealed in this manner and supply the necessary OTR required for ultimate products, e.g., packaged vegetables, of quality (see Example 6). The inventive film therefore provides the fresh produce industry with the ability to economically produce packaged vegetables, especially vegetables with high oxygen transmission requirements, in packages with resistance seals.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A film comprising:

a first outer layer of styrene-butadiene copolymer and, a second layer of a single site catalyst polyethylene;

wherein, said film has an oxygen permeability of about 150–450 or greater up to about 1000 cc/100 in$^2$/24 hr., and can be sealed with resistance seals.

2. The film of claim 1 having an oxygen permeability of about 260–400 cc/100 in$^2$/24 hr.

3. The film of claim 2 having an oxygen permeability of about 300 cc/100 in$^2$/24 hr.

4. The film of claim 2 having an oxygen permeability of about 350–360 cc/100 in$^2$/24 hr.

5. The film of claim 2 having an oxygen permeability of about 400 cc/100 in$^2$/24 hr.

6. A film comprising:

a first, outer layer of styrene-butadiene copolymer and a second layer of single site catalyst polyethylene;

wherein, said film has an oxygen permeability of about 150–450 or greater up to about 1000 cc/100 in$^2$/24 hr., and can be sealed on a form, fill and seal machine.

7. The film of claim 1 or 6 wherein the first and second layers are in intimate contact with each other.

8. The film of claim 1 or 6 wherein the first and second layers are coextruded.

9. The film of claim 8 wherein the first and second layers are in intimate contact with each other.

10. The film of claim 1 or 6 further comprising a third layer of single site catalyst polyethylene wherein said second layer is disposed between the first and the third layers.

11. The film of claim 10 wherein the first and second layers are coextruded and, the third layer is adhesively laminated to the second layer.

12. The film of claim 11 wherein the first and second layers are in intimate contact with each other.

13. The film of claim 11 further comprising printing on the second or third layer.

14. A film consisting essentially of a first, outer layer of styrene-butadiene copolymer and, a second layer of single site catalyst polyethylene, said film having an oxygen permeability of about 150–450 or greater up to about 1000 cc/100 in$^2$/24 hr.

15. The film of claim 14 further consisting essentially of a third layer of single site catalyst polyethylene, said second layer being disposed between said first and third layers.

16. The film of claim 14 wherein the first and second layers are in intimate contact.

17. The film of claim 15 wherein the first and second layers are in intimate contact.

18. The film of claim 16 wherein the first and second layers are coextruded.

19. The film of claim 17 wherein the first and second layers are coextruded and, the third layer is adhesively laminated to the second layer.

20. The film of claim 15 having an oxygen permeability of about 260–400 cc/100 in$^2$/24 hr.

21. The film of claim 20 having an oxygen permeability of about 300–400 cc/100 in$^2$/24 hr.

22. A package comprised of a film of any one of claims 1, 6 or 14 wherein the second layer is heat sealed.

23. A package comprised of a film of claim 10 wherein the third layer is heat sealed.

24. The film of claim 14 having an oxygen permeability of about 260–400 cc/100 in$^2$/24 hr.

25. The film of claim 15 wherein the first and second layers are coextruded and, the third layer is adhesively laminated to the second layer with a solventless adhesive.

26. The film of claim 25 further consisting essentially of printing on the second or third layer.

27. A film consisting of a first, outer layer of styrene-butadiene copolymer and, a second layer of single site catalyst polyethylene, said film having an oxygen permeability of about 150–450 cc/100 in$^2$/24 hr.

28. The film of claim 27 further consisting of a third layer of single site catalyst polyethylene, said second layer being disposed between said first and third layers.

29. The film of claim 28 wherein the first and second layers are coextruded.

30. The film of claim 29 wherein the first and second layers are coextruded and, the third layer is adhesively laminated to the second layer with a solventless adhesive.

31. The film of claim 30 having an oxygen permeability of about 260–400 cc/100 in$^2$/24 hr.

32. A package consisting essentially of a film of any one of claims 14 or 27 wherein the second layer is heat sealed with resistance seals.

33. A package consisting essentially of a film of any one of claims 15 or 28 wherein the third layer is heat sealed with resistance seals.

34. A package comprised of a film of claim 15 wherein the third layer is heat sealed.

35. The package of claim 22 containing produce.

36. The package of claim 23 containing produce.

37. The package of claim 32 containing produce.

38. The package of claim 33 containing produce.

39. The package of claim 34 containing produce.

40. The package of claim 35 wherein the produce is cabbage or lettuce.

41. The package of claim 36 wherein the produce is cabbage or lettuce.

42. The package of claim 37 wherein the produce is cabbage or lettuce.

43. The package of claim 38 wherein the produce is cabbage or lettuce.

44. The package of claim 39 wherein the produce is cabbage or lettuce.

* * * * *